US007207545B2

(12) United States Patent
Kawai et al.
(10) Patent No.: US 7,207,545 B2
(45) Date of Patent: Apr. 24, 2007

(54) THROTTLE BODIES WITH THROTTLE VALVES ACTUATED BY MOTORS

(75) Inventors: Shinji Kawai, Aichi-ken (JP); Hisashi Kino, Aichi-ken (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 0 days.

(21) Appl. No.: 10/702,647

(22) Filed: Nov. 7, 2003

(65) Prior Publication Data

US 2004/0119041 A1 Jun. 24, 2004

(30) Foreign Application Priority Data

Nov. 8, 2002 (JP) ............................ 2002-361477

(51) Int. Cl.
*F16K 31/04* (2006.01)

(52) U.S. Cl. ................................ 251/129.11; 251/305

(58) Field of Classification Search ........ 251/305–308, 251/129.11–129.13; 123/337, 399
See application file for complete search history.

(56) References Cited

U.S. PATENT DOCUMENTS 4,763,874 A * 8/1988 Ogawa .................. 251/129.11
5,615,861 A * 4/1997 Pollmann et al. ........... 251/306
5,992,378 A * 11/1999 Parkinson ................... 123/337
6,119,652 A * 9/2000 Waples et al. .............. 123/337
6,244,565 B1 * 6/2001 McDonnell et al. ... 251/129.12
6,267,352 B1 * 7/2001 Semeyn et al. ........ 251/129.12
6,557,523 B1 * 5/2003 Bos et al. .................... 123/337
6,626,421 B2 * 9/2003 Torii et al. .................. 251/305

FOREIGN PATENT DOCUMENTS

| | | |
|---|---|---|
| DE | 199 03 490 | 8/2000 |
| DE | 100 48 937 | 4/2002 |
| GB | 2 303 405 | 2/1997 |
| JP | 09-049443 | 2/1997 |
| JP | 2001132495 | 5/2001 |
| WO | WO 01/36799 | 5/2001 |

* cited by examiner

*Primary Examiner*—John Bastianelli
(74) *Attorney, Agent, or Firm*—Dennison, Schultz & MacDonald

(57) ABSTRACT

A throttle body (1) includes a throttle casing (2) and a motor casing (8). The throttle casing has a first main body (3) and a throttle valve (4) disposed within the first main body. The first main body is made of resin. The motor casing (8) has a second main body (9) and a motor (11) disposed within the second main body. The first main body and the second main body are formed separately from each other and are connected to each other via a joint device (27).

21 Claims, 4 Drawing Sheets

THROTTLE BODIES WITH THROTTLE VALVES ACTUATED BY MOTORS

This application claims priority to Japanese patent application serial number 2002-361477, the contents of which are incorporated herein by reference.

BACKGROUND OF THE INVENTION

1. Field of the Invention

The present invention relates to throttle bodies that have throttle valves actuated by motors for controlling the rotational speed of internal combustion engines.

2. Description of the Related Art

There are known throttle bodies that have motor actuated throttle valves. For example, Japanese Laid-Open Patent Publication No. 2001-132495 teaches a throttle body in which a throttle valve, a throttle shaft, a motor, a gear mechanism, and a throttle sensor, are disposed. The throttle valve is secured to the throttle shaft and the motor rotatably drives the throttle shaft. The gear mechanism serves to transmit the driving force of the motor to the throttle shaft. The throttle sensor serves to detect a degree of opening of the throttle valve.

Additionally, in recent years in order to reduce the weight and the manufacturing costs of an automobile, there has been a tendency to use materials such as resin in the fabrication of automobiles parts, possibly including such parts as throttle bodies.

However, in the case of throttle bodies made of resin, there is a possibility that some problems may be caused by this material selection. These problems will be explained with reference to FIG. 4.

A conventional throttle body 61 is shown in FIG. 4 and includes a main body 62. The main body 62 has a bore wall portion 62*a* that defines an intake air channel, in which a throttle valve 5 is disposed. The main body 62 also defines a space for receiving a motor 11. In the case where the main body 62 is made of resin, the heat produced by the motor 11 may not be effectively dissipated to the outside of the main body 62, due to the low heat conduction efficiency of the material. Therefore, there is a possibility of overheating and damaging the motor 11. In addition, because the heat may not be effectively dissipated, the bore wall portion 62*a* may be thermally deformed and cause unwanted interference with the throttle valve 5. In such a situation, the controllability of the throttle valve 5 may be lessened. Further, if a molding process, such as an injection molding process, forms the main body 62, there is a possibility that attaining the substantial circularity of the intake air channel will be inhibited due to the variations in the thickness of the bore wall portion 62*a* along the circumferential length of the intake air channel. The resulting bore wall portion 62*a* due to molding conditions may also cause unwanted interference with the throttle valve 5.

SUMMARY OF THE INVENTION

It is accordingly an object of the present invention to teach improved techniques for ensuring the substantial circularity of an intake air channel when a lightweight and/or low cost material, such as resin for example, is used in the fabrication of a throttle body.

According to one aspect of the present teachings, throttle bodies are taught which include a throttle casing. The throttle casing includes a first main body in which a throttle valve is disposed. The first main body is made of a synthetic resin, e.g., ABS resin, by using an appropriate molding process, such as an injection molding process for example. The first main body may be formed as an individual component. Another component, a motor casing, includes a second main body, may accommodate a motor and/or a gear mechanism and/or a throttle sensor, within the second main body. The first main body is connected to the second main body via a joint device, e.g., screws, rivets, spring clips, snap connections, etc.

The first main body has a relatively simple structure and the freedom of design unencumbered by the constraints of additional functions. The first main body can be individually designed in order to reduce or minimize the residual molding stresses and strains that may be caused by substantial variations in molded wall thickness. In addition, because the first main body of the throttle casing is a component separate from the second main body of the motor casing, the unwanted conduction of heat from the motor to the bore wall portion during throttle valve operation can be reduced. Interposing an appropriate heat insulation material between the first main body and the second main body can further minimize the unwanted conduction of heat.

An additional aspect of the present invention has a throttle body wherein the first main body includes a substantially cylindrical bore portion that defines a flow channel. Disposed within the flow channel is the throttle valve. The cylindrical bore portion has a substantially uniform thickness in the circumferential direction.

The potential deformation of the throttle casing due to either residual molding stress and/or strain, or due to the conduction of heat from the motor, can be reduced or minimized. This allows the substantial circularity of the inner wall of the bore portion to be more easily maintained and controlled, resulting in a reduction in unwanted interference with the throttle valve during normal operating conditions.

According to another aspect of the present teachings, the motor casing can be made of a high thermal conductivity material, e.g., such as metal for example. Preferably, the metal may be lightweight metal, e.g., examples such as aluminum or aluminum alloy. Therefore, the heat of the motor may be effectively dissipated directly to the outside of the motor casing, causing a further reduction in the conduction of motor generated heat to the throttle casing.

In another aspect of the present teachings, the throttle bodies further include a coupling device for coupling the throttle valve to the motor. Therefore, the rotation of the motor can be transmitted to the throttle valve via the coupling device. Preferably, the coupling device couples the throttle valve to the motor at the same time that the first main body and the second main body are connected to each other via the joint device.

In still another aspect of the present teachings, the throttle casing further includes a throttle shaft that is rotatably disposed within the first main body and the throttle valve is mounted on the throttle shaft. The motor casing further includes a gear mechanism for transmitting rotation of the motor to the throttle shaft. Thus, the motor casing also serves as a gear casing. The coupling device serves to couple the throttle shaft to the gear mechanism.

In a further aspect of the present teachings, the gear mechanism includes a drive shaft that extends from the second main body. The coupling device includes a recess and a projection that is formed on one and the other of the drive shaft and the throttle shaft and is engageable with each other for transmitting rotation of the drive shaft to the throttle shaft.

In another aspect of the present teachings, the throttle body further includes a cover that has a third main body that is formed separately from the first main body and the second main body. The third main body is mounted on the second main body in order to cover the motor and associated elements, e.g., the gear mechanism, from the outside of the motor casing. Therefore, the motor casing and the cover can be assembled into a subassembly that has the motor and the gear mechanism disposed therein. The throttle casing may then be connected to the motor casing of the subassembly. Preferably, the third main body is made of metal, in particular a lightweight metal, such as for example, aluminum or aluminum alloy among others, so that the heat of the motor can also be efficiently dissipated from the cover.

In still another aspect of the present teachings, a seal device, e.g., possibly an O-ring, is interposed between the first main body and the second main body in order to provide a seal there between. Therefore, any dust or unwanted foreign particles are inhibited from entering and possibly damaging the internal elements of the throttle body (e.g., the throttle valve, the motor, the gear mechanism, a throttle sensor, etc.). As a result, the internal elements are protected in order to operate reliably in the performance of their individual functions.

DETAILED DESCRIPTION OF THE INVENTION

Each of the additional features and teachings disclosed above and below may be utilized separately or in conjunction with other features and teachings to provide improved throttle bodies and methods of using such throttle bodies. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A representative embodiment will now be described with reference to FIGS. 1 to 3. A representative throttle body 1 includes three separate members, i.e., a throttle casing 2, a motor/gear casing 8, and a cover 20, that are formed individually and assembled into the throttle body 1.

Figure 1:
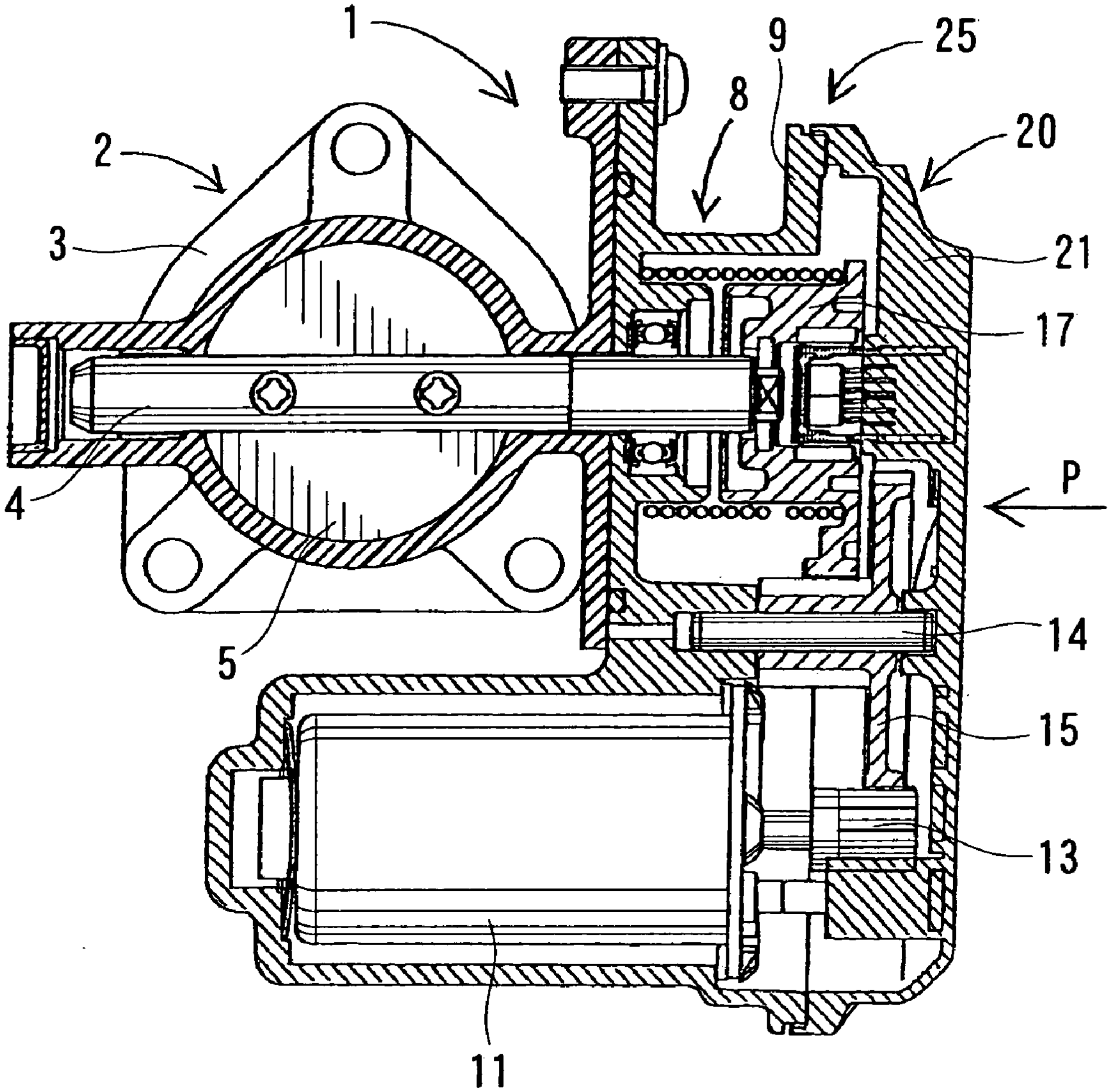
FIG. 1 is a cross sectional view of a representative throttle body according to the present invention.
Figure 2:
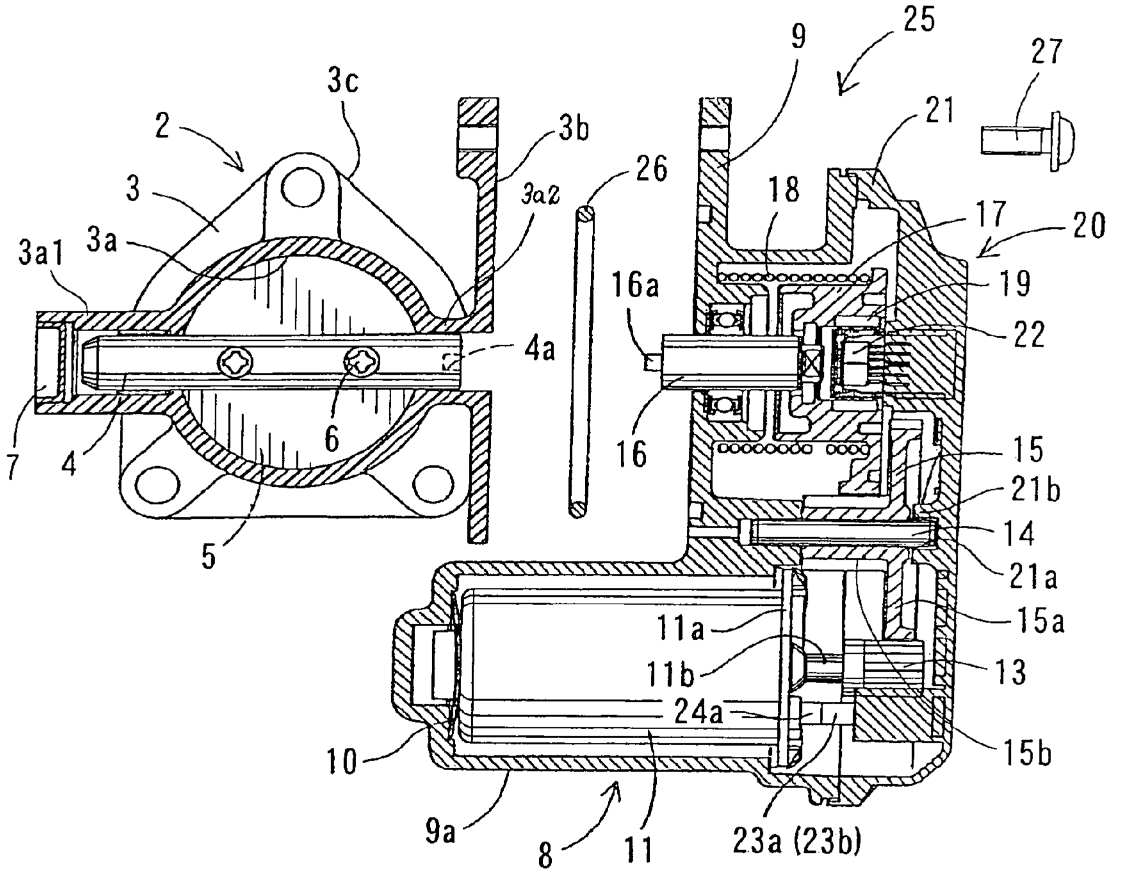
FIG. 2 is an exploded view of FIG. 1.

Referring to FIGS. 1 and 2, the first member, the throttle casing 2, has an integral first main body 3 that is made of synthetic resin, e.g., ABS resin. The first main body 3 may be formed by an injection molding process. A cylindrical bore portion 3a is disposed within the first main body 3 and defines an intake air channel. A throttle valve 5 is disposed within the intake air channel. A throttle shaft 4 extends across the intake air channel and is rotatably supported via tubular sleeves **3*a*1 and 3*a*2. The tubular sleeves 3*a*1 and 3*a*2 extend from opposing sides of the bore portion 3*a* in a diametrical direction. The throttle valve 5 is secured to the throttle shaft 4 via fastening devices, in this case, screws 6. A recess 4a is formed in an end surface of an end (the right end as viewed in FIG. 2) of throttle shaft 4 that terminates within the tubular sleeve 3*a*2. The recess 4*a* serves to engage a drive shaft 16 that will be explained later. The other end of the throttle shaft 4 terminates within the tubular sleeve 3*a*1. A seal plug 7 is pressfitted into the end (the left end as viewed in FIG. 1) of tubular sleeve 3*a*1 in order to inhibit communication between the inner space of the tubular sleeve 3*a*1** and the outside environment.

A first flange **3*b* extends in an outward radial direction from the tubular sleeve 3*a*2, i.e., perpendicular to the axis of the throttle shaft 4. The first flange 3*b* is adapted to secure the motor/gear casing 8 to the throttle casing 2. A second flange 3*c* is disposed at one axial end of the bore portion 3*a* and extends in an outward radial direction from bore portion 3*a*. The second flange 3*c* is adapted to secure the throttle casing 2** to an intake manifold of an internal combustion engine (not shown).

The bore portion **3*a* has a substantially uniform thickness along a circumferential direction. In addition, each of the first and second flanges 3*b* and 3*c*** also have a substantially uniform thickness. Therefore, any residual stress and/or strain created by the molding process can be minimized.

Referring to FIGS. 1 and 2, the second individual member, the motor/gear casing 8 of throttle body 1, has a second main body 9 made of a thermally conductive material. For example, such a material may be a metal, in particular a lightweight metal, preferably aluminum or aluminum alloy. The second main body 9 has a cylindrical portion **9*a* that is closed at one end (the left end as viewed in FIG. 2). A motor 11 is disposed within the cylindrical portion 9*a* and is biased along an axial direction by a biasing means, in this drawing a leaf spring 10 is shown. The motor 11 has an integral bracket 11*a* that is fixed to the second main body 9 via fastening devices, such as bolts 12 (see FIG. 3). A drive gear 13 is fixed to an output shaft 11*b* of the motor 11, so that the drive gear 13 rotates in the same direction and rotational speed of output shaft 11*b***.

A gear shaft 14 is press-fitted into a corresponding fitting hole formed in the second main body 9. An intermediate gear 15 is rotatably mounted on the gear shaft 14. The intermediate gear 15 can be fixed along the axial direction relative to the gear shaft 14 by a third main body 21 of the cover 20 that is mounted to the second main body 9 of the motor/gear casing 8, as will be explained later.

A drive shaft 16 is rotatably supported within the second main body 9. A throttle gear 17 is mounted on the drive shaft 16, such that the drive shaft 16 rotates in the same direction and at the same rotational speed as the throttle gear 17. The throttle gear 17 is configured as a sector gear.

A projection **16*a* extends from one end (left end as viewed in FIG. 2) of the drive shaft 16 and is engageable with the recess 4a of the throttle shaft 4, so that the throttle shaft 4 can rotate in the same direction and at the same rotational speed as the drive shaft 16. The recess 4*a* and the projection 16*a* may have a D-shaped cross section. Alternatively, the recess 4*a* and the projection 16*a*** may have a polygonal cross sectional configuration.

A biasing device, shown as a torsion coil spring 18, is disposed within the second main body 9 and serves to bias the throttle valve 5 in the closing direction. To achieve this result, one end of the torsion coil spring 18 is attached to the throttle gear 17. The other end of the torsion coil spring 18 is attached to the second main body 9. The torsion coil spring 18 biases the throttle valve 5 via the throttle gear 17 towards a fully closed position of the throttle valve 5.

Magnets 19 are fitted into the throttle gear 17 in positions facing a throttle sensor 22, throttle sensor 22 will be explained later. The intermediate gear 15 has a large gear portion 15*a* and a small gear portion 15*b* that respectively engage the drive gear 13 and the throttle gear 17. The engagement of the gears causes the rotational speed of the motor 11 to be transmitted at a reduced level to the throttle gear 17. The rotation of the throttle gear 17 is then directly transmitted to the throttle valve 5 via the drive shaft 16. As a result, the throttle valve 5 is opened and closed as the motor 11 rotates in one direction and a direction opposite thereto, respectively.

Referring to FIGS. 1 and 2, the third separate member, the cover 20, has a third main body 21 that is made of a lightweight, high thermally conductive material such as metal, preferably aluminum or aluminum alloy similar to the material of the second main body 9 of the motor/gear casing 8. The throttle sensor 22 is mounted on the third main body 21 in a position facing the magnets 19 that are fitted into the throttle gear 17. The sensor 22 is electrically connected to an electrical control unit (ECU) (not shown) that serves to control the operation of the engine in a known manner.

A boss portion 21*b* is formed on the third main body 21 in a position facing the gear shaft 14. The boss portion 21*b* has a bottomed axial cavity 21*a* that rotatably receives the right end (as viewed in FIG. 2) of the gear shaft 14. When the third main body 21 is mounted to the second main body 9 of the motor/gear casing 8, the left end (as viewed in FIG. 2) of the boss portion 21*b* closely opposes the end surface of the intermediate gear 15, so that the intermediate gear 15 can be restrained from moving along the axial direction between the second main body 9 and the third main body 21.

Terminals 23*a* and 23*b* (only one terminal 23*a* is shown in the drawings) are attached to the third main body 21 in positions opposite to the motor 11 in an axial direction substantially parallel to the motor 11 axis. The terminals 23*a* are electrically connected to a power source, e.g., a battery, via electric wires (not shown). The motor 11 has terminals 24*a* and 24*b* (see FIG. 3) corresponding to the terminals 23*a* and 23*b* and adapted to be mechanically and electrically coupled to terminals 23*a* and 23*b*, respectively, when the third main body 21 is mounted to the second main body 9.

The third main body 21 may be fixed in position relative to the second main body 9 by means of a fixing device, preferably screws (not shown), so that a subassembly 25 can be created which includes the motor/gear casing 8 and the cover 20. Any other appropriate coupling or tightening devices, examples such as a snap-fit mechanism, spring clips, or rivets, may be used in place of screws. In addition, a sealing device, preferably an O-ring (not shown) or any other seal member, may be provided between the motor/gear casing 8 and the cover 20 in order to ensure a hermetic seal for the internal elements, which includes the sensor 22, the magnets 19, the gears 13, 15, and 17, and the motor 11, among others.

The subassembly 25 may be fixed in position relative to the first flange 3*b* of the first main body 3 via fixing devices, preferably screws 27. A sealing device, preferably an O-ring 26, may be interposed between the flange 3*b* and the second main body 9 in order to ensure a hermetic seal for the intake air channel and also to provide protection for the internal elements of the subassembly 25, inhibiting dust or other unwanted foreign particles from entering the interior of subassembly 25.

Figure 3:
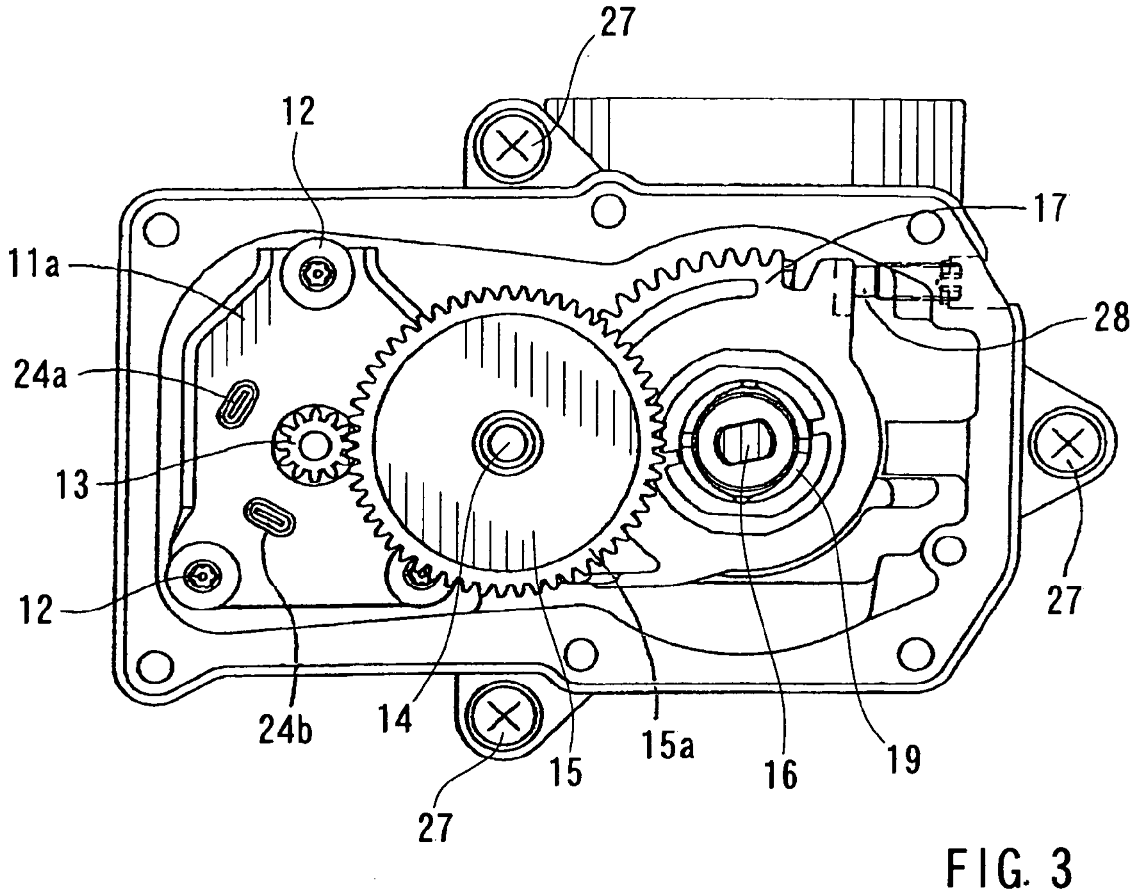
FIG. 3 is a side view of the throttle body as viewed in the direction of arrow P in FIG. 1.
Figure 4:
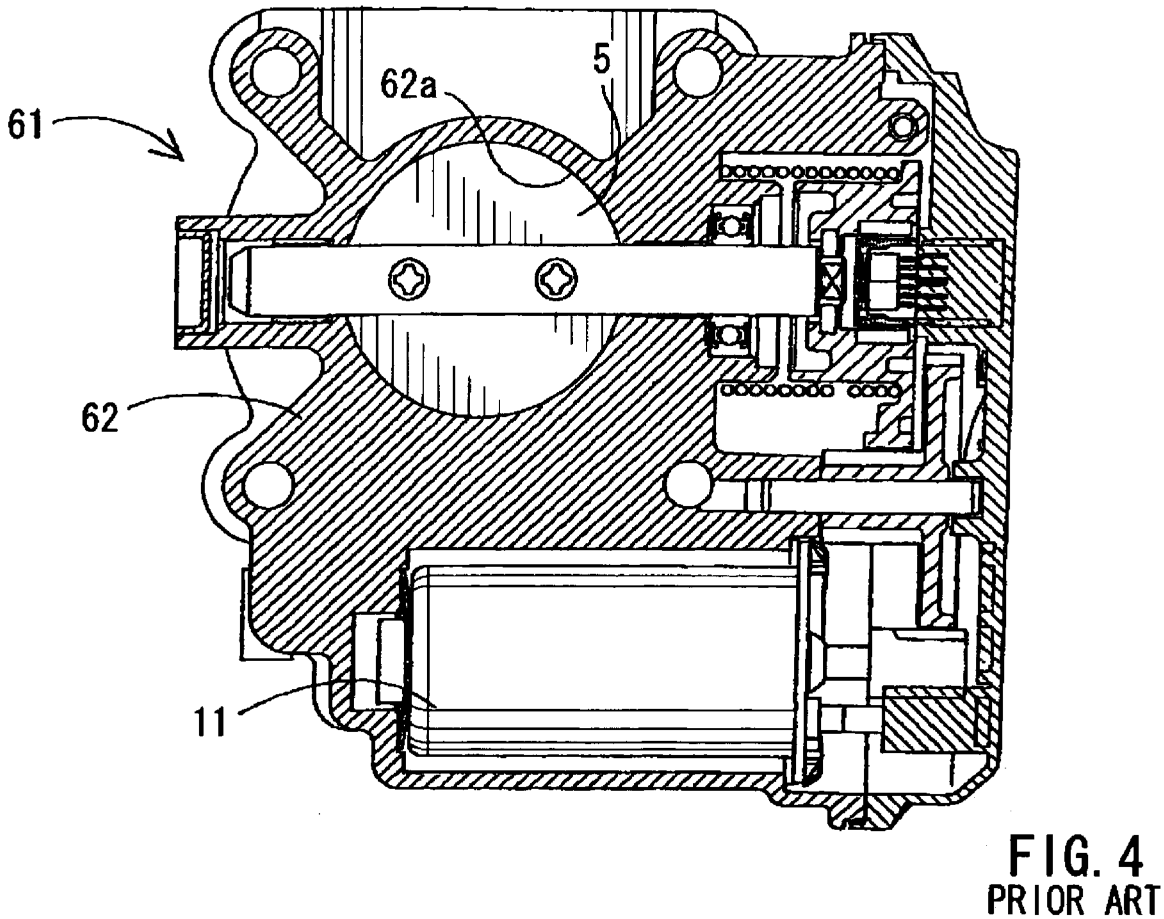
FIG. 4 PRIOR ART
FIG. 4 is a cross sectional view of a conventional throttle body.

Referring to FIG. 3, an adjusting means, preferably a screw 28, is mounted within the second main body 9 of the motor/gear casing 8 and is positioned to oppose to the throttle gear 17 in a rotational direction, preferably in the closing direction of the throttle valve 5. Therefore, as the throttle gear 17 rotates in the closing direction, the throttle gear 17 contacts one end of the adjusting screw 28, so that the throttle gear 17 as well as the throttle valve 5 is inhibited from further rotation. The adjusting screw 28 determines the full-close position of the throttle valve 5 and advancing or retracting the adjusting screw 28 by manually rotating the adjusting screw 28 can subsequently adjust the full-close position.

As described previously, in the representative embodiment the throttle body 1 includes three separate main parts; the throttle casing 2, the motor/gear casing 8, and the cover 20. After associated elements are mounted onto each of the separate parts, the parts may be assembled together to form the throttle body 1. For example, in regards to the throttle casing 2, the associated elements may include the throttle shaft 4 and the throttle valve 5, among others. In case of the motor/gear casing 8, the associated elements may include the motor 11, the gears 13, 15, and 17, among others. In case of the cover 20, the associated elements may include the throttle sensor 22, among others Because the throttle casing 2 is a separate member apart from the motor/gear casing 8 and the cover 20, the design of a mold that is used in the molding process of the throttle casing 2 can be optimized to provide such parameters as substantially uniform thickness of the wall of bore portion 3*a*, as well as a uniform thickness of the flanges 3*a* and 3*b*. Therefore, the unwanted potential deformation of the bore portion 3*a*, and the flanges 3*a* and 3*b*, due to residual molding strain and/or stress, or potential deformation due to heat conducted from the motor 11, can be reduced or minimized.

In addition, because the second main body 9 of the motor/gear casing 8 may be made of a material having a high thermal conductivity, the heat of the motor 11 may be effectively dissipated to the outside of the motor/gear casing 8. Therefore, overheating of motor 11 and any possible resultant damage due to the over beating thereof, can be avoided.

The present invention is not restricted to the embodiments described above. Various modifications and variations of the above embodiments are possible without departing from the scope of the present invention. For example, while in the above embodiments the throttle casing 2 is formed of resin, the throttle casing 2 may also be formed of some other material, for example metal. Additionally, the construction of the throttle sensor 22 is not limited to the constructions depicted in the above-described embodiment; it is possible to adopt various types of construction.

What is claimed is:

1. A throttle body comprising:

a throttle casing including:

a first main body; and a throttle valve disposed within the first main body;

wherein the first main body is made of resin;

wherein the first main body includes a substantially cylindrical bore portion that defines a flow channel, in which the throttle valve is disposed;

wherein at least a part of the cylindrical bore portion disposed proximally to the throttle valve in a fully closed position comprises a substantially uniform radial thickness along a circumferential direction;

a motor casing including:

a second main body; and a motor disposed within the second main body; and a gear mechanism arranged and constructed to transmit rotation of the motor to the throttle valve;

wherein the second main body comprises a first portion defining a first space for receiving the motor and a second portion defining at least a part of a second space for receiving the gear mechanism;

wherein the first portion and the second portion are formed integrally with each other; and a coupling device arranged and constructed to couple the first and second main bodies to each other.

2. A throttle body as in claim 1, wherein:

the throttle casing further includes a throttle shaft that is rotatably disposed within the first main body and the throttle valve is mounted on the throttle shaft;

the motor casing further includes a gear mechanism for transmitting rotation of the motor to the throttle shaft, and the coupling device is arranged and constructed to couple the throttle shaft to the gear mechanism.

3. A throttle body as in claim 1, further comprising:

a cover including a third main body;

wherein the third main body is arranged and constructed to be removably attached to the second main body; and wherein attachment of the cover inhibits communication between a gear mechanism and the motor of the motor casing and an external environment.

4. A throttle body comprising:

a throttle casing comprising:

a resin throttle main body; and a throttle valve disposed within a substantially cylindrical bore formed in the throttle main body;

wherein the throttle valve includes a shaft portion rotatably mounted in tubular sleeves extending radially outward in a diametrical direction from the substantially cylindrical bore;

wherein the substantially cylindrical bore proximate to the throttle valve in a fully closed position has a uniform radial thickness along a circumferential direction of the substantially cylindrical bore except for areas corresponding to the tubular sleeves;

a motor casing comprising:

a motor main body; and a motor disposed within the motor main body;

a cover comprising a cover main body;

wherein the throttle casing is attached to the motor casing; and wherein the cover is attached to the motor casing;

a gear mechanism arranged and constructed to transmit rotation of the motor to the throttle valve;

wherein the motor main body comprises a first portion defining a first space for receiving the motor and a second portion defining at least a part of a second space for receiving the gear mechanism; and wherein the first portion and the second portion are formed integrally with each other.

5. A throttle body comprising:

a throttle casing comprising:

a resin throttle main body; and a throttle valve disposed within a substantially cylindrical bore formed in the throttle main body;

a shaft portion rotatably mounted in tubular sleeves extending radially outward in a diametrical direction from the substantially cylindrical bore;

wherein the throttle valve is disposed on the shaft portion;

a motor casing comprising:

a motor main body; and a motor;

a gear mechanism interacting with a drive portion;

wherein the motor is disposed within a first space defined within the motor main body;

a cover comprising a cover main body;

a coupling comprising:

a first engaging part disposed on one of the shaft portion or the drive portion;

a second engaging part disposed on an other of the shaft portion or the drive portion;

wherein the shaft portion is attached to the drive portion via the first engaging part and the second engaging part of the coupling;

wherein a rotation of the motor correspondingly rotates the throttle valve via the gear mechanism;

wherein the throttle casing is attached to the motor casing; and wherein the cover is attached to the motor casing, defining a second space for enclosing the gear mechanism and the motor between the cover and the motor casing;

wherein the motor casing comprises a first portion defining the first space and a second portion defining at least a part of the second space; and wherein the first portion and the second portion are formed integrally with each other.

6. A throttle body as in claim 1, wherein the gear mechanism comprises a drive gear mounted to an output shaft of the motor, a throttle gear serving as an output gear for driving the throttle valve, and an intermediate gear disposed between the drive gear and the throttle gear, and the first portion of the second body includes a support portion for supporting the throttle gear and the intermediate gear.

7. A throttle body as in claim 6, wherein the throttle gear comprises a part of a sensor for detecting a position of the throttle valve.

8. A throttle body as in claim 4, wherein the gear mechanism comprises a drive gear mounted to an output shaft of the motor, a throttle gear serving as an output gear for driving the throttle valve, and an intermediate gear disposed between the drive gear and the throttle gear, and the first portion of the second body includes a support portion for supporting the throttle gear and the intermediate gear.

9. A throttle body as in claim 8, wherein the throttle gear comprises a part of a sensor for detecting a position of the throttle valve.

10. A throttle body as in claim 5, wherein the gear mechanism comprises a drive gear mounted to an output shaft of the motor, a throttle gear serving as an output gear for driving the throttle valve, and an intermediate gear disposed between the drive gear and the throttle gear, and the first portion of the second body includes a support portion for supporting the throttle gear and the intermediate gear.

11. A throttle body as in claim 10, wherein the throttle gear comprises a part of a sensor for detecting a position of the throttle valve.

12. A throttle body comprising:

a throttle casing including:

a first main body; and a throttle valve disposed within the first main body;

wherein the first main body is made of resin;

wherein the first main body includes a substantially cylindrical bore portion that defines a flow channel, in which the throttle valve is disposed;

wherein at least a part of the cylindrical bore portion disposed proximally to the throttle valve in a fully closed position comprises a substantially uniform radial thickness along a circumferential direction;

a motor casing including;

a second main body; and a motor completely disposed within a substantially cylindrical fist space defined in the second main body;

wherein the first main body and the second main body are formed separately from each other and joined to each other;

wherein the second main body comprises a substantially cylindrical portion defining the first space and an extension extending from the cylindrical portion in a direction substantially perpendicular to an axial direction of the cylindrical portion;

wherein the cylindrical portion is closed at one end in the axial direction;

wherein the first portion and the second portion are formed integrally with each other; and a gear mechanism arranged and constructed to transmit rotation of the motor to the throttle valve; and wherein the extension of the second main body defines at least a part of a second space for receiving, the gear mechanism.

13. A throttle body as in claim 12, further comprising a drive shaft disposed on the same axis as a rotational axis of the throttle valve, wherein the extension rotatably supports the drive shaft, the gear mechanism comprises a throttle gear as an output gear, and the throttle gear is mounted to the drive shaft.

14. A throttle body as in claim 13, wherein the gear mechanism further comprises a drive gear mounted to an output shaft of the motor and an intermediate gear disposed between the drive gear and the throttle gear, and wherein the intermediate gear is mounted to an intermediate shaft supported by the extension of the second main body.

15. A throttle body as in claim 13, further comprising a throttle shaft disposed within the first main body and extending across the flow channel of the bore portion, and wherein the drive shaft is coupled to the throttle shaft.

16. A throttle body as in claim 12, wherein each of the first and second spaces is open on one side with respect to the axial direction of the motor and is closed on the opposite side.

17. A throttle body comprising:

a throttle casing including:

a first main body; and a throttle valve disposed within the first main body;

wherein the first main body is made of resin;

wherein the first main body includes a substantially cylindrical bore portion that defines a flow channel, in which the throttle valve is disposed;

wherein at least a part of the cylindrical bore portion disposed proximally to the throttle valve in a fully closed position comprises a substantially uniform radial thickness along a circumferential direction;

a motor casing including;

a second main body; and a motor disposed within the second main body;

wherein the first main body and the second main body are formed separately from each other and joined to each other;

a throttle gear arranged and constructed to transmit the rotation of the motor to the throttle valve;

wherein the second main body defines at least a part of a receiving space for receiving the throttle gear; and a throttle sensor disposed within the receiving space in a position opposing to the throttle gear.

18. A throttle body as in claim 17, further comprising a third main body attached to the second main body, and wherein the sensor is mounted to the third body.

19. A throttle body as in claim 18, wherein the third main body comprises a cover, so that .the receiving space is defined between the second main body and the cover.

20. A throttle body as in claim 17, wherein the throttle gear has an inner circumferential surface, and wherein the throttle sensor opposes to the inner circumferential surface of the throttle gear in a radial direction.

21. A throttle body as in clam 20, further comprising at least one magnet attached to the inner circumferential surface of the throttle gear.

* * * * *